United States Patent [19]

Sato

[11] Patent Number: 5,481,249
[45] Date of Patent: Jan. 2, 1996

[54] BIDIRECTIONAL COMMUNICATION APPARATUS FOR TRANSMITTING/RECEIVING INFORMATION BY WIRELESS COMMUNICATION OR THROUGH A POWER LINE

[75] Inventor: Hideaki Sato, Yokohama, Japan

[73] Assignee: Canon Kabushiki Kaisha, Tokyo, Japan

[21] Appl. No.: 380,939

[22] Filed: Jan. 31, 1995

Related U.S. Application Data

[63] Continuation of Ser. No. 15,821, Feb. 10, 1993, abandoned.

[30] Foreign Application Priority Data

Feb. 14, 1992 [JP] Japan ................... 4-028233

[51] Int. Cl.⁶ ........................................ G05B 23/02
[52] U.S. Cl. ................ 340/825.06; 340/825.03; 340/310.01
[58] Field of Search ............... 340/825.69, 825.72, 340/825.06, 825.54, 825.03, 310.01, 538, 539; 370/24, 31, 32; 375/40, 100; 455/100, 101; 395/114

[56] References Cited

U.S. PATENT DOCUMENTS

| | | | |
|---|---|---|---|
| 3,390,335 | 6/1968 | Miyagi | 455/69 |
| 3,757,032 | 9/1973 | Minerd et al. | 178/4.1 |
| 3,980,954 | 9/1976 | Whyte | 455/45 |
| 4,638,298 | 1/1987 | Spiro | 340/825.52 |
| 4,720,873 | 1/1988 | Goodman et al. | 455/5.1 |
| 5,057,829 | 10/1991 | Velazquez | 340/825.06 |
| 5,161,021 | 11/1992 | Tsai | 340/310 A |
| 5,247,540 | 9/1993 | Hoge | 370/32 |

OTHER PUBLICATIONS

Pat. Abs. Jp., vol. 12, No. 130 (E–603) Apr. 21, 1988 (JP-A-62256536).
Pat. Abs. Jp., vol. 14, No. 361 (M–1006) Aug. 6, 1990 (JP-A-21028881).
Pat. Abs. Jp., vol. 16, No. 142 (E–1187) Apr. 9, 1992 (JP-A-04000919).

*Primary Examiner*—Donald J. Yusko
*Assistant Examiner*—Edwin C. Holloway, III
*Attorney, Agent, or Firm*—Fitzpatrick, Cella, Harper & Scinto

[57] ABSTRACT

Full duplex communication is attained by using only one communication channel in wireless communication between a host computer 1 and a printer 6. The communication from the host computer 1 to the printer 6 is effected by wireless, and the communication from the printer 6 to the host computer 1 which includes a small amount of information is effected through a power line 9.

11 Claims, 2 Drawing Sheets

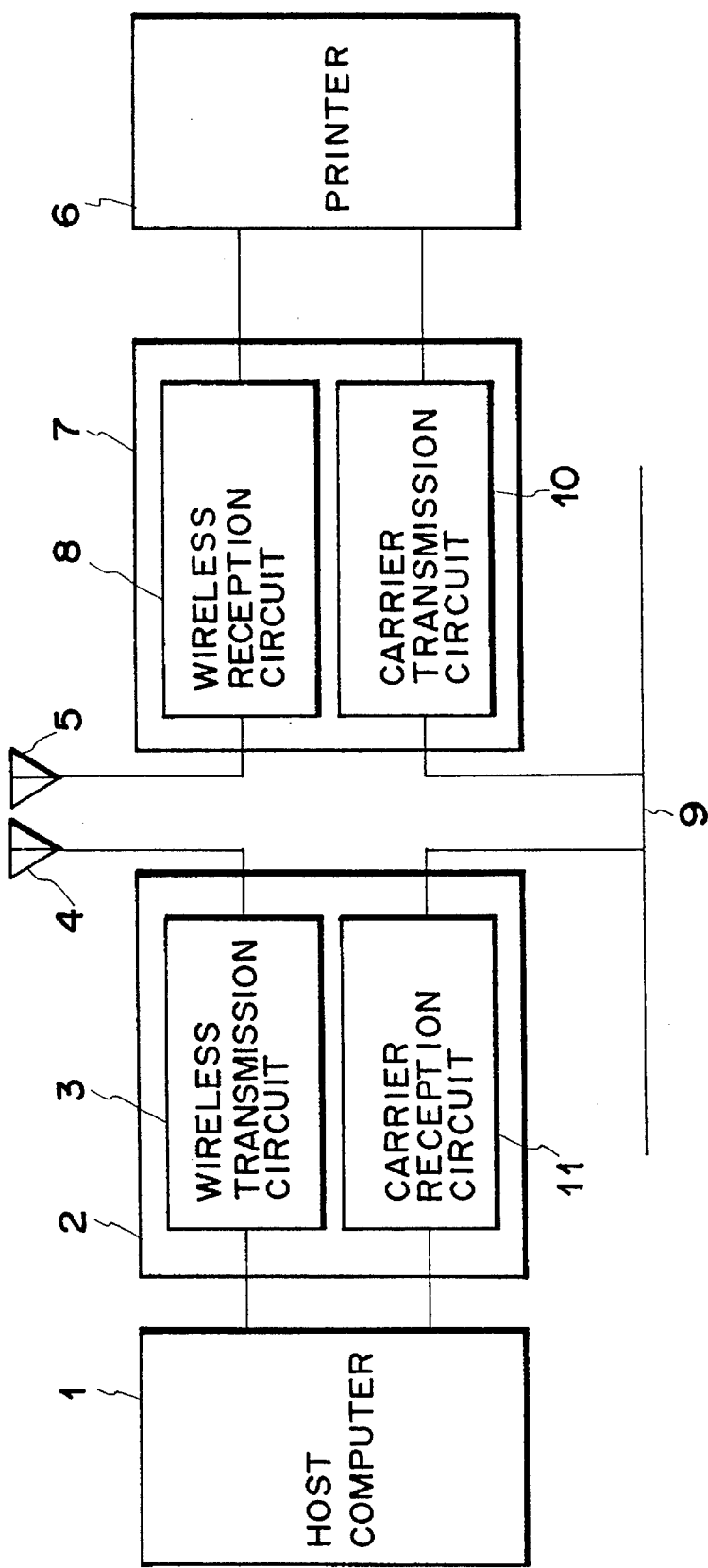

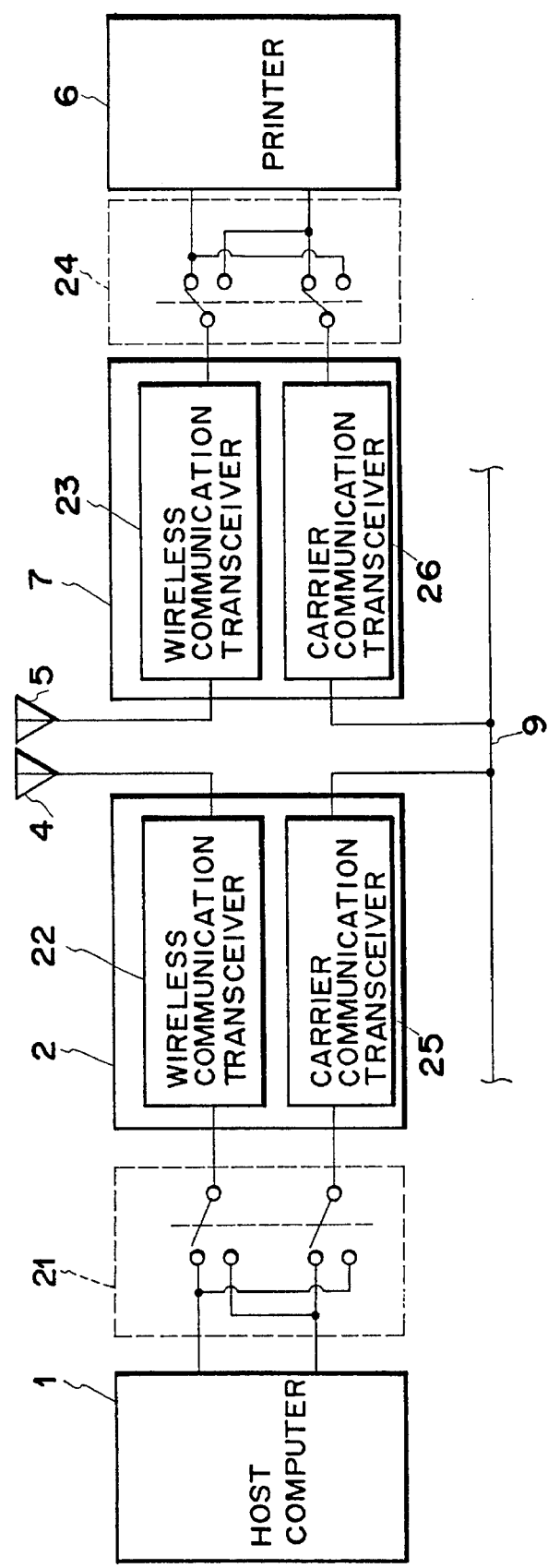

BIDIRECTIONAL COMMUNICATION APPARATUS FOR TRANSMITTING/RECEIVING INFORMATION BY WIRELESS COMMUNICATION OR THROUGH A POWER LINE

This application is a continuation of application Ser. No. 08/015,821 filed Feb. 10, 1993, abandoned.

BACKGROUND OF THE INVENTION

1. Field of the Invention

The present invention relates to a wireless communication apparatus and, more particularly, to a communication apparatus for data communication for in-house use, office automation or the like.

2. Related Background Art

In the past, wireless data communication for in-house use has been done in Japan by using a small power wireless apparatus. In such data communication, a communication circuit added to each data terminal has a transceiver. When such a transceiver is used for full duplex communication, electromagnetic waves (channels) of different frequencies for the respective directions of communication are required.

The foregoing bands of electromagnetic waves available to the communication are now in short supply. Nevertheless, in the prior art, two channels are always occupied without regard to the amount of information to be communicated.

SUMMARY OF THE INVENTION

It is an object of the present invention to provide a communication apparatus which solves the above problem and can save channels with a simple construction. According to the present invention, in the case where there is a difference in the amount of information depending on the direction of communication, such as communication between a host computer and a printer, wireless communication is used for the communication direction having the larger amount of information to be communicated, a power line is used and an electric line carrier communication circuit is added for communication in the other direction, so that full duplex communication is attained while occupying only one channel.

The reason for preferably using the electric light line carrier communication for the communication of the direction of less communication information is that it is not permitted, by legal regulation, to superimpose a signal having a broad frequency band on the power line and hence it is not suitable for the transmission of a large amount of information.

BRIEF DESCRIPTION OF THE DRAWINGS

FIG. 1 shows a block diagram of a configuration of a first embodiment of the present invention, and FIG. 2 shows a block diagram of a configuration of a second embodiment of the present invention.

DETAILED DESCRIPTION OF THE PREFERRED EMBODIMENTS

FIG. 1 shows a first embodiment of the present invention. In FIG. 1, numeral 1 denotes a host computer (for example, a personal computer), numeral 2 denotes a communication apparatus which is connected to the host computer 1, numeral 3 denotes a wireless transmission circuit of the communication apparatus 2, numeral 4 denotes a transmission antenna, numeral 5 denotes a receiving antenna, numeral 6 denotes a printer, numeral 7 denotes a communication apparatus which is connected to the printer, numeral 8 denotes a wireless receiver circuit of the communication apparatus 7, numeral 9 denotes a commercial power line from which the computer 1, the communication apparatus 2, the printer 6 and the communication apparatus 7 are powered, numeral 10 denotes an electric light line carrier transmission circuit of the communication apparatus 7, and numeral 11 denotes an electric light line carrier receiving circuit of the communication apparatus 2.

In the present embodiment, the amount of information required between the computer 1 and the printer 6 is much larger in the direction from the computer 1 to the printer 6 (hereinafter referred to as a down line) than in the opposite direction (hereinafter referred to as an up line). Namely, a large amount of information such as character information and image information to be printed out flows over the down line while a relatively small amount of information such as a handshake signal at the start of the communication and a retransmission request (ARQ) or the like when an error occurs in the course of communication flows over the up line.

In FIG. 1, the relatively large amount of information sent out of the computer 1 is transmitted to the printer 6 through the down line, namely the wireless transmission circuit 3, the antenna 4, the antenna 5 and the wireless receiver circuit 8.

On the other hand, the relatively small amount of information sent out of the printer 6 is transmitted to the computer 1 through the up line, that is, the electric light line carrier transmission circuit 10, the commercial power line 9 and th electric light line carrier receiver circuit 11.

When there is a difference in the amounts of the information between the up line and the down line, the wireless communication is allocated to the communication of the larger information amount and the power line carrier communication is allocated to the communication of the smaller information amount so that only one wireless channel is used and a valuable saving in band width is achieved.

In the present embodiment, it is assumed that the information amount of the down line is larger than that of the up line. In the opposite case, the complementary measure of exchanging the communication apparatuses 2 and 7 may be taken.

FIG. 2 show a second embodiment of the present invention.

Those elements which are duplicates of the elements of the first embodiment are designated by the same numerals and the explanation thereof is omitted.

In FIG. 2, numerals 21 and 24 denote double-throw switching circuits, numerals 22 and 23 denote wireless communication transceiver circuits, and numerals 25 and 26 denote electric light line carrier communication transceiver circuits.

In the present embodiment, the transceiver circuit 22 is used in place of the wireless transmission circuit of the first embodiment, the transceiver circuit 23 is used in place of the wireless receiver circuit, the electric light line carrier transceiver circuit 26 is used in place of the power line carrier transmission circuit, and the electric light line carrier transceiver circuit 25 is used in place of the electric light line receiver circuit. The double-pole double-throw switching circuit 21 is provided between the computer 1 and the communication apparatus 2 and the double-pole double-throw switching circuit 24 is provided between the communication apparatus 7 and the printer 6 so that the up line and the down line can be switched to either the wireless communication or the electric light line carrier communication.

In the present embodiment, if the amounts of information of the up line and the down line are reversed, the double-pole double-throw switches are switched to cope therewith.

The double-pole double-throw switching circuits 21 and 24 are not limited to the mechanical contacts as shown but they may be of electric circuit type.

The switching may be made automatically in response to automatic information amount detection means (not shown).

In the in-house wireless data communication, the electric light line carrier communication is additionally used, and the wireless communication is used for the line of the larger information amount among the up line and the down line and the electric light line carrier communication is used for the line of the smaller information amount. As a result, the number of channels of the electric wave can be reduced by half.

What is claimed is:

1. A bidirectional communication apparatus powered from a power line, comprising:

first means for transmitting and receiving information by wireless communication;

second means connected to the power line for receiving and transmitting information through the power line; and switching means for switching said apparatus between a first state in which transmission to another communication apparatus is effected by wireless communication using said first means and reception from the other communication apparatus is effected through the power line using said second means, and a second state in which transmission to the other communication apparatus is effected through the power line using said second means and reception from the other communication apparatus is effected by wireless communication using said first means.

2. A communication apparatus according to claim 1 wherein said switching means switches in accordance with different amounts of information to be transmitted.

3. A communication apparatus according to claim 1, wherein said communication apparatus receives print data from a computer and the information transmitted by said first or said second means includes the print data received from the computer.

4. A communication apparatus according to claim 3, further comprising the computer.

5. A communication apparatus according to claim 1, wherein said communication apparatus transmits print data to a printer and the information received by said first or said second means includes the print data transmitted to the printer.

6. A communication apparatus according to claim 5, further comprising the printer.

7. A system comprising a plurality of bidirectional communication apparatuses, each apparatus comprising:

first means for transmitting and receiving information by wireless communication;

second means connected to the power line for receiving and transmitting information through the power line; and switching means for switching said apparatus between a first state in which transmission to another one of said communication apparatuses is effected by wireless communication using said first means and reception from the other apparatus is effected through the power line using said second means, and a second state in which transmission to the other apparatus is effected through the power line using said second means and reception from the other apparatus is effected by wireless communication using said first means, wherein said system performs communication between each pair of said apparatuses by performing transmission and reception between said communication apparatus and any other one of the plurality of communication apparatuses.

8. A system according to claim 7, wherein in each communication, one apparatus of the pair transmits print data from a computer and the other apparatus receives the print data to be outputted to a printer.

9. A system according to claim 8, further comprising the computer.

10. A system according to claim 8, further comprising the printer.

11. A bidirectional communication method comprising the steps of:

providing a first amount of information and a second, lesser amount of information; and switching between a first state in which transmission is effected by wireless communication and reception is effected through a power line, and a second state in which transmission is effected through the power line and reception is effected by wireless communication, said switching being performed to effect transmission and reception of the first amount of data by wireless communication and the second amount of data through the power line.

* * * * *